United States Patent [19]

Namiki

[11] 4,321,705
[45] Mar. 23, 1982

[54] DIGITAL EQUALIZER FOR A CROSS-POLARIZATION RECEIVER

[75] Inventor: Junji Namiki, Tokyo, Japan

[73] Assignee: Nippon Electronics Co., Ltd., Tokyo, Japan

[21] Appl. No.: 125,671

[22] Filed: Feb. 28, 1980

[30] Foreign Application Priority Data

Mar. 2, 1979 [JP] Japan .................................. 54-24764
Mar. 2, 1979 [JP] Japan .................................. 54-24765
Mar. 2, 1979 [JP] Japan .................................. 54-24768
Jun. 18, 1979 [JP] Japan .................................. 54-76542

[51] Int. Cl.³ .......................................... H04B 1/10
[52] U.S. Cl. ..................................... 375/14; 328/165;
328/167; 333/18; 333/28 R; 375/99; 375/101;
455/295; 455/296
[58] Field of Search ..................... 375/11–15,
375/96, 97, 99–103; 455/295, 616, 60, 296;
370/19, 20, 21, 78, 79, 11, 19, 2; 364/824, 825;
343/100 PE; 333/18, 28 R; 328/165, 167

[56] References Cited

U.S. PATENT DOCUMENTS 3,631,232 12/1971 Perreault ............................... 375/11
3,735,266 5/1973 Amitay .......................... 340/100 PE
4,027,105 5/1977 Kannowade ......................... 370/20
4,112,370 9/1978 Monsen ............................... 375/100

OTHER PUBLICATIONS

Two Existential Applications of Zero–Forcing Equalization Method, Y. Sato–IEEE Transactions on Communications, Jun. 1975–pp. 684–687.
Automatic Equalization for Digital Communication, The Bell System Technical Journal, Apr. 1965, R. W. Lucky, pp. 547–588.
New Automatic Polarization Cancelling Control for Multiple-Station Satellite Communication System by Lin-Shan Lee, EDUTEL Communication & Development Inc.-ICC, '78–pp. 43.3.1 to 43.3.5.
An Automatic Equalizer for General-Purpose Communication Channel by R. W. Lucky and H. R. Rudin-The Bell System Technical Journal, Nov. 1967, pp. 2179-2280.
The Comstar Program-R. D. Briskman-Comsat Technical Review vol. 7 Number 1, Spr 1977–pp. 1-34.
A 4800 Bit/s Microprocessor Data D. Modem-K. Watanabe, K. Inoe and Y. Sato IEEE Transaction Communication, vol. COM-26, No. 5, May 1978, pp. 493-498.

Primary Examiner—Benedict V. Safourek
Assistant Examiner—Stephen Chin
Attorney, Agent, or Firm—Laff, Whitesel, Conte & Saret

[57] ABSTRACT

The invention is used in a receiver for a communication system, which transmits periodically occurring digital signals over a pair of orthogonally related polarized waves. Horizontal signals from one of the orthogonal waves are applied to a first input terminal of an equalizer in the receiver. Vertical signals from the other of the orthogonal waves are applied to a second input terminal. An individually associated, cascaded plurality of delay circuits is coupled to each of the input terminals. The delay in each of the delay circuits is equal to the time spacing between the occurring signals. Therefore, a plurality of the recurring digital signals appear simultaneously at the outputs of each of the delay circuits. A variable attenuator, individually associated with the output of each delay circuit, is adjusted to pass an incremental signal responsive to each of the occurring signals appearing simultaneously at the outputs of the delay circuits. These incremental signals are added to produce a first full signal when all of the digital signals received at one of the input terminals appear simultaneously at the outputs of the delay circuits associated therewith. The adder also adds the incremental signals to produce a second full signal when all of the digital signals received at the other of the input terminals appear simultaneously at the outputs of the delay circuits associated therewith. The polarity of the second full signal is opposite to the polarity of the first full signal. Therefore, the second full signal is subtracted from that part of the first full signal which appears simultaneously with the second full signal. This subtracted signal is the interference in the first signal which occurs responsive to the second signal. Therefore, only the signal applied to one input terminal appears at the output of the adder.

13 Claims, 9 Drawing Figures

DIGITAL EQUALIZER FOR A CROSS-POLARIZATION RECEIVER

The present invention relates to devices for cancelling cross-polarization interference which occurs when there is a high-frequency digital transmission over microwaves, or the like, and, more particularly, to digital equalizers and receivers especially well-suited for that form of transmission.

Radio communication using the microwave spectrum has made rapid progress, especially in the field of terrestrial and satellite communications. The need for radio communication is also expected to expand greatly in mobile communication service. Hence, there is a substantial need for a reuse of currently utilized frequency bands, in addition to an exploitation of the quasi-millimeter wave lengths and even high-frequency channels.

One approach to satisfy these needs involves an efficient use of cross-polarizations in the frequency channel allocation for 4 to 6 GHz FM (frequency modulation) transmission. The utility of this band is highest in fixed communication service using radio-relay systems. For example, the International Telecommunications Satellite organization (INTELSAT) is likely to adopt a cross-polarization, instead of a single polarization, sharing technique in the V series of satellites for practical use in the 4 to 6 GHz band.

To achieve such a cross-polarization, band-sharing technique, it is necessary to cancel cross-polarization interference. For example, this form of interference may occur when raindrops transfer energy from one polarized signal to another polarized signal sharing the same frequency. Thus, it is indispensable to compensate for rainfall-caused deterioration of polarization in a propagation wave. An improvement in the polarization characteristics of antennas and power feed systems is also desirable.

Free space enables an independent transmission of cross-polarized waves through two independent paths. However, since rainfall causes anisotropy in each actual transmission path, an unfavorable interference occurs between the cross-polarized waves through cross-coupling (i.e., depolarization) of their waves, if a cross-polarization sharing system is used.

An equalization circuit is used in an antenna feed system or a radio receiver to cancel cross-polarization interference and to provide automatic compensation for such cross-coupling between cross-polarized waves.

Analog transmission, mainly based on FM, has been used in the microwave band communication. Practical systems for cancelling cross-polarization have been designed to restore orthogonal relationships. In the intermediate frequency (IF) band, a variable phase shifter or an attenuator is coupled around an antenna feed system or arranged to cancel interference between individually cross-polarized waves, by means of an interference-cancelling circuit. For details about this latter type of a practical cancelling system, reference may be made to a paper by Lin-shan Lee, entitled "New Automatic Polarization Cancelling Control for Multiple-Station Satellite Communication Systems," International Communications Conference Record, 1978, pp. 43.3.1-43.3.5 (Reference 1). However, this system is complicated and incapable of properly eliminating interference between the cross-polarized waves.

Digital transmission has also come to be used in the microwave band in recent years. There is a greatly enhanced need for a more efficient digital transmission system for cancelling cross-polarization interferences.

Therefore, an object of the present invention is to provide a new and improved equalizer for a cross-polarization receiver. Here, an object is to cancel cross-polarization interference in digital transmission, with cancellation based on demodulated baseband signals.

Another object of this invention is to provide a receiver having a digital equalizer for eliminating cross-polarization interferences.

According to one aspect of this invention, it is possible to achieve digital transmission based on a cross-polarization sharing technique using conventional antenna systems and intermediate frequency equipment which do not have a sufficient cross-polarization discrimination.

Highly accurate cross-polarization discrimination cannot be expected at present because the beam width of a communication satellite antenna is considerably greater than that of a terrestrial microwave channel, because global beam antennas use asymmetrical beams to increase effective radiation power, and because Faraday rotation occurs in outer space.

In such a transmission system, this invention proves far superior to any comparable prior art system. Moreover, this invention is quite economical because it does not require modification of conventional signal radiation systems. Moreover, the present invention enables cross-polarization cancellation in each transmission station, even if signals which are transmitted from many stations are received by the same antenna, in a time-division fashion, as in a time-division multiple access (TDMA) system.

In accordance with the present invention, an equalizer is provided for use in digital radio transmission wherein first and second sequences of digital data . . . $a_{k-2}, a_{k-1}, a_k, a_{k+1}, a_{k+2}$ . . . (k being a positive integer) and $b_{k-2}, b_{k-1}, b_k, b_{k+1}, b_{k+2}$ . . . have the same bit rate and are carried by first and second polarized waves, which are orthogonal to each other. The equalizer for a cross-polarization receiver is composed of a filter which produces, from third and fourth sequences, the digital data . . . $A_{k-2}, A_{k-1}, A_k, A_{k+1}, A_{k+2}$ . . . and $B_{k-2}, B_{k-1}, B_k, B_{k+1}, B_{k+2}$ . . . which are obtained on the receiving side of a system responsive to the first and second polarized waves, respectively, corresponding to the first and second sequences. A fifth sequence of digital data . . . $C_{k-2}, C_{k-1}, C_k, C_{k+1}, C_{k+2}$ . . . is represented by the following equation, where each of the factors M, M', N and N' is either a zero or a positive integer:

$$C_k = \sum_{i=-N}^{N'} \alpha_i \cdot A_{k+i} + \sum_{i=-M}^{M'} \beta_i \cdot B_{k+i}$$

($\alpha_i$ and $\beta_i$ being complex constants)

The equalizer filter supplies the first sequence, free of cross-polarization interferences from the second polarized wave.

The advantages and features of the present invention will become more apparent from the following detailed description, taken in conjunction with the accompanying drawings wherein.

The same reference numerals identify corresponding parts throughout the entire drawings.

Figure 1:
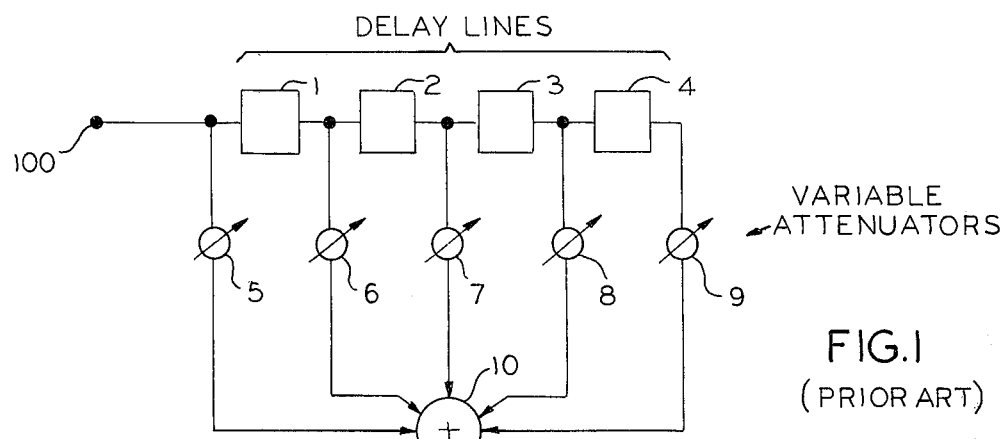
FIGS. 1 and 2 illustrate prior art automatic equalizers, to be used in the various embodiments of this invention.

In FIG. 1, frequency band-limited, random pulses . . . $A_{k-1}$, $A_k$, $A_{k+1}$ . . . (k being a positive integer) are successively fed to an input terminal 100 of a prior art automatic linear equalizer. The pulses appear at intervals of T seconds.

FIG. 1 includes four T-second delay circuits 1-4, variable attenuators 5-9, adder 10, sampler 11 and signal decision circuit 12. This circuit of FIG. 1 provides an estimated value $\hat{A}_k$ from a received pulse $A_k$ when a pulse $a_k$ (k being a positive integer) is transmitted, $a_k$ being presumed to be equal to $\hat{A}_k$ unless there is a transmission error. The function of the equalizer of FIG. 1 is to use the variable attenuators 5-9 to cancel intersymbolic interference $$\sum_{\substack{i=-2 \\ i \neq 0}}^{2} a_i \cdot A_{k+i}$$

between two successively transmitted pulses.

Known examples of procedures which automatically and ideally vary the attenuation $a_i$ of the variable attenuators 5-9 are described as the "zero forcing method" in a paper by R. W. Lucky, entitled "Automatic Equalization for Digital Communication," Bell System Technical Journal (BSTJ), vol. 44, April issue, 1965, pp. 547-588 (Reference 2). The "mean-square equalization method" is described in a paper by Lucky and Rudin, entitled "An Automatic Equalizer for General-Purpose Communication Channels," BSTJ, vol. 46, November issue, 1967, pp. 2179-2208 (Reference 3). The structure of my FIG. 1 is illustrated in FIG. 4 of Reference 2 and FIG. 3 of Reference 3. The signal decision circuit 12, sampler 11, and variable attenuators 5-9 (FIG. 1) may be the slicer +e volts, sampler and attenuator counters of FIG. 4 of Reference 2.

An automatic equalizer using a delay line with tap gains is described on page 2191 of Reference 3. When the equalizer is designed, it has the following three parameters which must be established: band width, tap spacing, and the number of taps. As Lucky et al point out in Reference 3, the usable band width must be at least coincident with the channel band width. A Fourier series is used to represent the particular distortion characteristic which is to be eliminated. The accurate determination of the number of taps is made on a case-by-case calculation. Therefore, these parameters are best expressed in a mathematical format.

Further, if random pulses fed to the input terminal 100 (FIG. 1) are a complex signal (such as a four-phase shift-keying (PSK) modulation signal or a 16-value quadrature amplitude modulation (QAM) signal), the automatic equalization method may be as described in a paper by Yoichi Sato, entitled "Two Extensional Applications of the Zero Forcing Equalization Method," IEEE Transactions on Communications, vol. COM-23, June 1975, pp. 684-687 (Reference 4).

Equalizers using the above-mentioned automatic equalization methods differ from one another only in the circuit which is used to estimate tap gains of the variable attenuators. In general, they have same structure that is illustrated in FIG. 1, with the exception that they use automatic nonlinear equalizers.

An automatic nonlinear equalizer (FIG. 2) from the prior art has about the same structural elements that are shown in FIG. 1 except for the adders 13 and 14.

Figure 2:
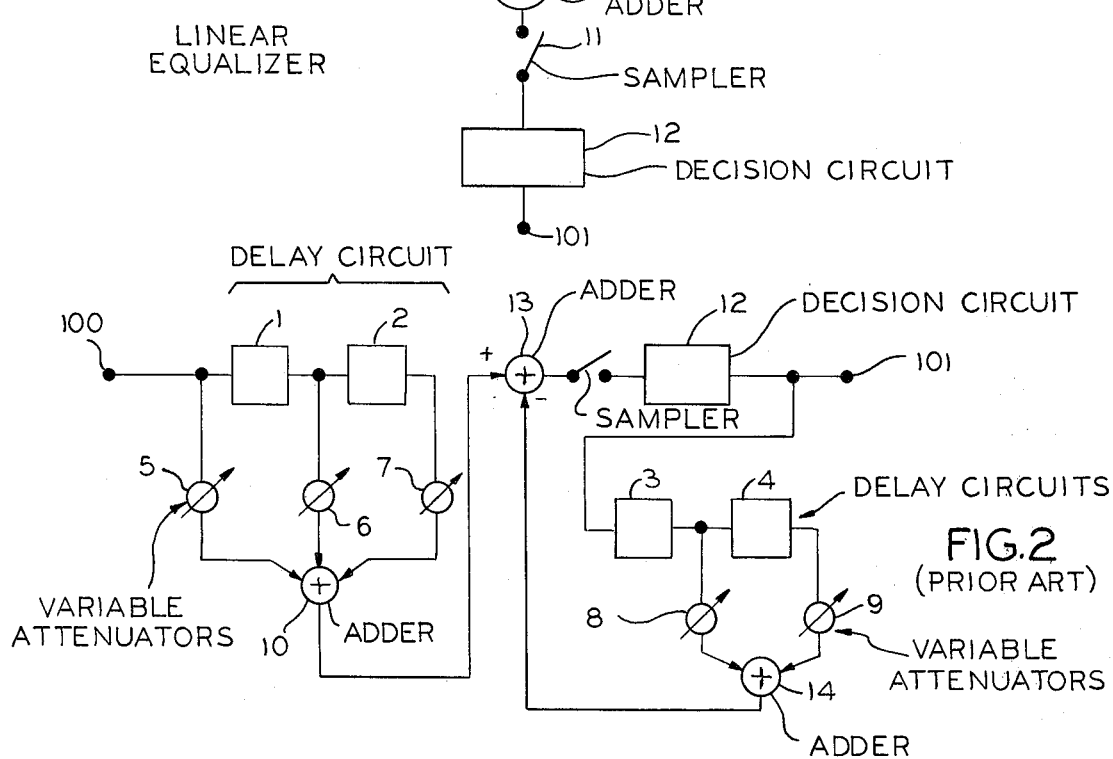

In greater detail, the structure of FIG. 2 differs from that of FIG. 1 in that the interference from a preceding transmitted pulse is cancelled on the basis of a recognition of the preceding pulse. The FIG. 2 circuit operates on the same principle that the structure of FIG. 1 uses. For details of the structure shown in FIG. 2, reference is made to FIG. 1 in a paper by K. Watanabe et al, entitled "A 4800 BITS/MICROPROCESSOR DATA MODEM," IEEE Transactions on Communications, Vol. COM-26, No. 5, May 1978, pp. 493-498 (Reference 5).

Therefore, it is assumed now that the structure of the automatic equalizer used in this invention is that of FIG. 1, and that its variable attenuators handle complex signals.

A satellite communication system (FIG. 3), in which cross-coupling occurs between cross-polarized waves, includes a transmitting earth station 30, a receiving earth station 31, and a communications satellite 32.

A horizontally polarized wave (called an "H-wave") 300 and a vertically polarized wave 301 ("V-wave") are transmitted on the same carrier frequency. The main cross-polarization interference which occurs from the V-wave to the H-wave is an interference signal 302 arising on the uplink (transmission from the earth to the satellite) and an interference 303 arising on the downlink (transmission from the satellite to the earth station). There is also a self-interference 304 within the H-wave itself. If the two polarized waves have the same carrier frequency, all these interferences appear in a baseband signal obtained by coherent (synchronous) detection as the sum of the individual interferences. Accordingly, if each interference component is accurately identified, the total interference may be cancelled by subtracting each interference component from the detected baseband signal.

First, the self-interference 304 is regarded as a usual distortion in a multiplex propagation path. It can be cancelled by the conventional automatic equalizer illustrated in FIG. 1.

Next, the interferences 302 and 303 from the V-wave can also be completely eliminated, if the pulse transmitted from the V-wave side is identified. This pulse is passed through the automatic equalizer to reproduce the interfering pulse and to subtract this reproduced pulse from the total signal picked up by the receiver.

One embodiment 4000 (FIG. 4A) of the present invention used in the receiving earth station 31 includes a filter 4010. A demodulated baseband signal transmitted by the H-wave is fed to an input terminal 400. A demodulated baseband signal transmitted by the V-wave is applied to an input terminal 401.

Figure 4A:
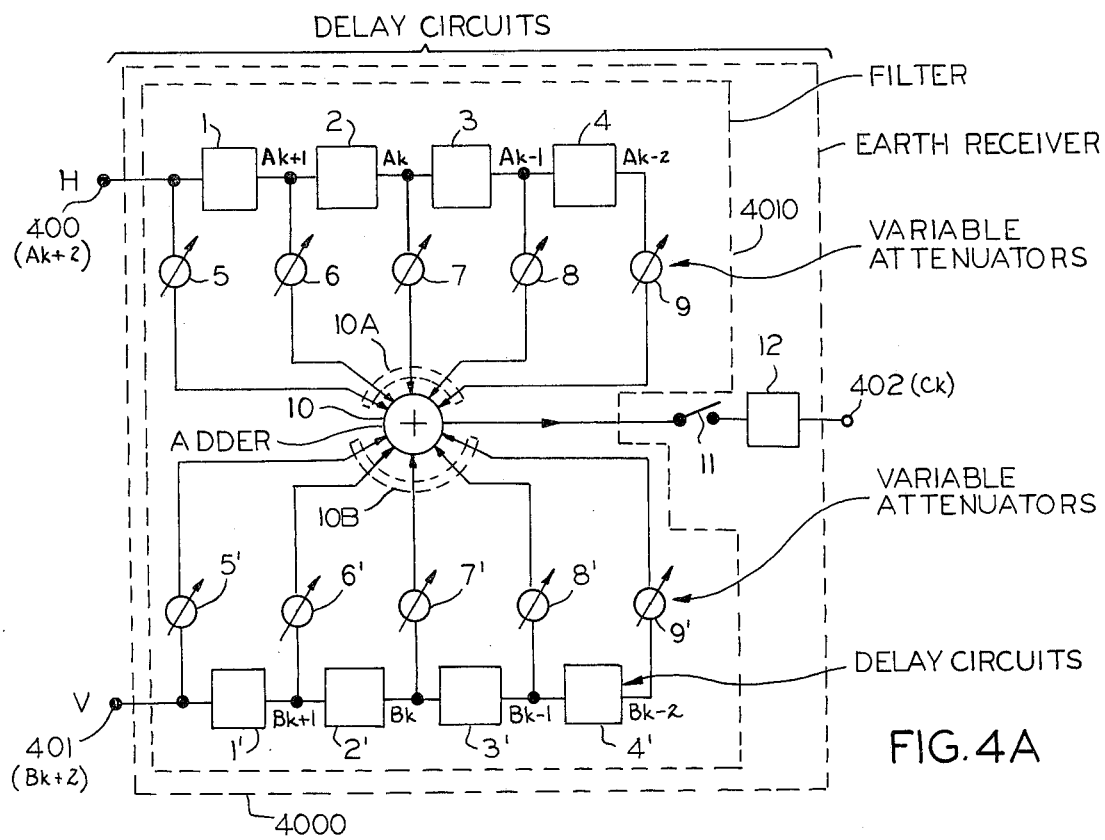
FIG. 4A illustrates a first embodiment of this invention.

In this structure of FIG. 4A, the interference from the V-wave to the H-wave is cancelled, and only the original component of the H-wave is extracted. Therefore, the equalizer illustrated in FIG. 4A is needed to cancel the interference caused by the V-wave acting upon the H-wave.

Figure 3:
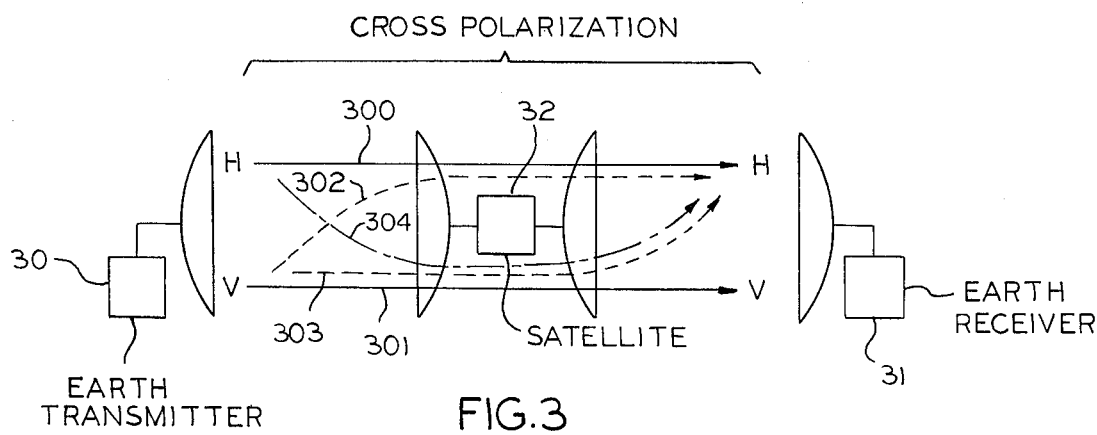
FIG. 3 is a diagram which may be useful for describing cross-polarization interference in a satellite communication system.

The outputs 10A (FIG. 4A) of attenuators 5, 6, 7, 8 and 9 are connected to an adder 10 which eliminates the sum $$\sum_{i=-2}^{2} -\alpha_i \cdot A_{k+i},$$

that is the waveform distortion component of the H-wave and its self-interference 304 signal illustrated in FIG. 3. The term (N, N') may be used to represent the values $i = -2, 2$ in the foregoing sum.

Next, the outputs 10B (FIG. 4A) of attenuators 5', 6', 7', 8' and 9' are also connected to the adder 10, which cancels the sum $$\sum_{i=-2}^{2} -\beta_i \cdot B_{k+i}$$

that expresses the cross-polarization interferences 302 and 303 signals seen in FIG. 3. The term (M, M') may be used to represent the values $i = -2, 2$ in the foregoing sum. Accordingly, only the H-wave component $$C_k = \sum_{i=-2}^{2} \alpha_i \cdot A_{k+i} + \sum_{i=-2}^{2} \beta_i \cdot B_{k+i},$$

which is free of all the interferences and is equal to $a_k$, is supplied from an output terminal 402.

The procedures for controlling the tap gains $\alpha_i$ and $\beta_i$ of the attenuators 5, 6, 7, 8 and 9, and 5', 6', 7', 8' and 9', respectively, may be regarded as an expansion of the procedure used by the automatic equalizer of FIG. 1. That is to say, the H- and V-waves carry random pulses which are entirely uncorrelated with each other. Two pulse sequences are not mutually correlated with respect to the time series. Therefore, the difference can be minimized if the tap gain of each attenuator is selected so that the time-averaged product (cross correlation) of the input to the attenuator and the difference between the received pulse $A_k$ and its estimated value $\hat{A}_k$ become zero, resulting in an orthogonality principle. For more details about this orthogonality principle, reference may be made to pp. 2184-2185 of Reference 3.

Figure 4B:
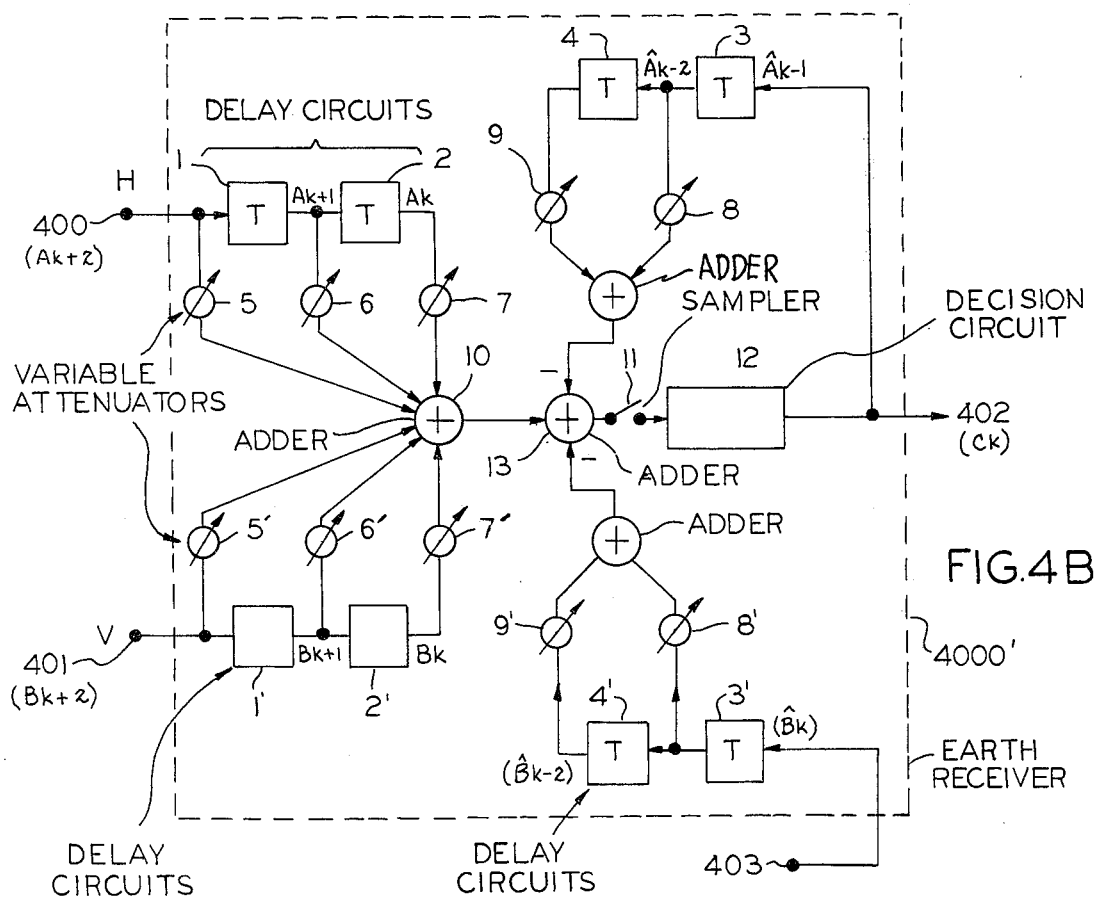
FIG. 4B illustrates a second embodiment of this invention.

A second embodiment of this invention (FIG. 4B) uses the procedures of the automatic equalizer shown in FIG. 2. In FIG. 4B, the interference from a preceding transmitted pulse is cancelled on a basis of the recognition of the preceding pulse. As stated above, it is necessary to supply an input terminal 403 with a signal which is produced as a result of the recognition of a preceding pulse transmitted on the V-wave side. Thus, to take the example of FIG. 6, which will be referred to in greater detail below, an output terminal 402' of an earth receiver station (block 4000') has to be connected to the terminal 403 (FIG. 4B).

Figure 6:
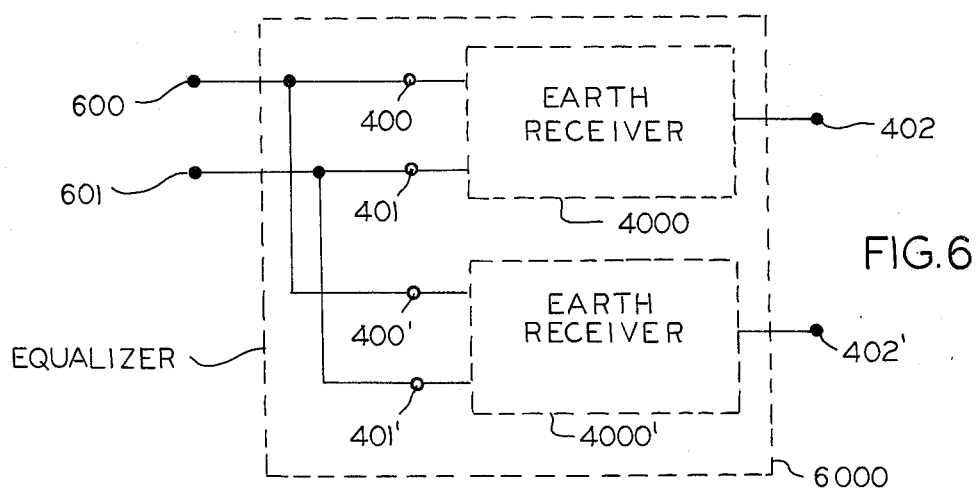
FIG. 6 illustrates another embodiment of this invention.

Conversely, if the block 4000' of FIG. 6 is realized in the embodiment illustrated in FIG. 4B, it is necessary to connect the terminal 403 of FIG. 4B to the output of a terminal 402 of FIG. 6 responsive to the recognition of a preceding pulse transmitted on the H-wave side.

Figure 5:
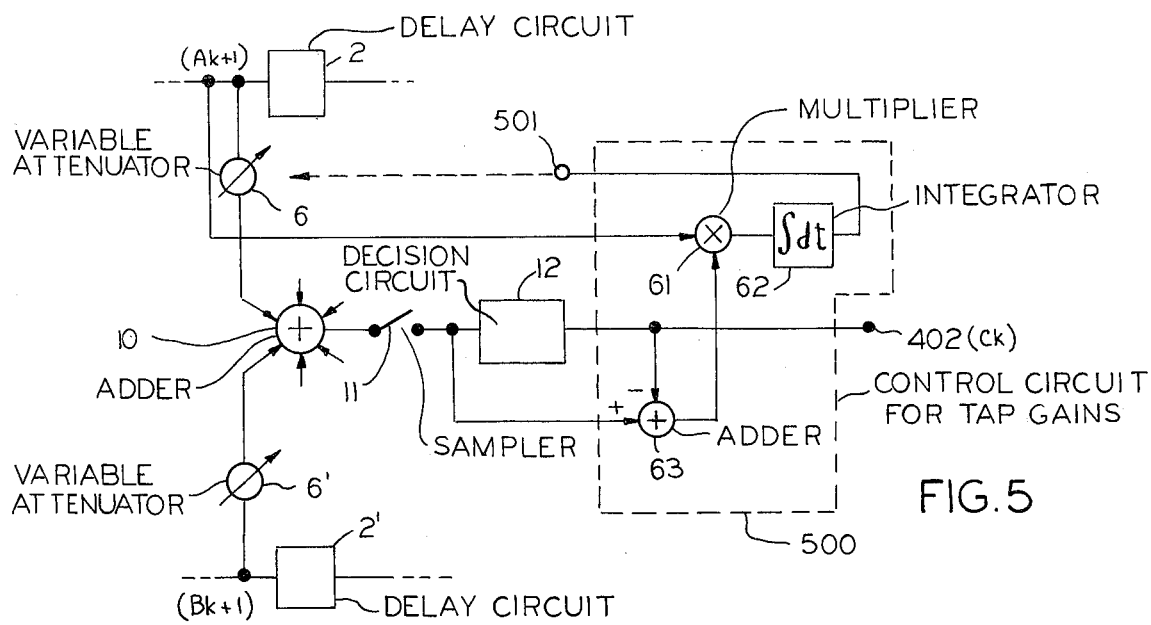
FIG. 5 illustrates a circuit for controlling any of the variable attenuators in FIGS. 4A and 4B.

FIG. 5 illustrates a control circuit 500 for controlling the tap gain of the variable attenuator 6 shown in FIGS. 4A and 4B. An adder 63 is used for detecting the difference $(A_k - \hat{A}_k)$ between the received pulse $A_k$ and its estimated value $\hat{A}_k$. A multiplier 61 and an integrator 62 are used for detecting the orthogonality (correlation) between the immediately following received pulse $A_{k+1}$ and the difference $(A_k - \hat{A}_k)$. Responsive thereto, the tap gain $\alpha_1$ of the variable attenuator 6 is increased or decreased according to the positiveness or negativeness of the correlation.

The tap gains of other variable attenuators can be controlled in the same manner. If the transmission channel is stable and if there is no channel switching, the circuit 500 (FIG. 5) is unnecessary. In such a case, it will be sufficient to preset the tap gain of each attenuator to an appropriate value.

The present equalizer (FIG. 6) for cancelling interference between two sequences of random pulses transmitted on the H-wave and V-wave has earth receiver structural elements 4000 and 4000' which may be identical with the receiver of block 4000 shown in FIG. 4A or 4B. To input terminals 600 and 601 are respectively fed the baseband signals which are transmitted by the H- and V-waves. The earth receiver block 4000 supplies an H-wave component to an output terminal 402, free of interference from the V-wave. The earth receiver 4000' supplies an output terminal 402' with a V-wave component, free of interference from the H-wave. Between the blocks 4000 and 4000', their respective attenuators 5-9 and 5'-9' (shown in FIG. 4A or FIG. 4B) are used in an inverse relationship to each other.

Generally, the cross-coupling caused interference from one polarized wave P1 (not shown) to the other polarized wave P2 can be regarded as symmetrical to the interference from the wave P2 to the wave P1. Therefore, there is no need to set the new filter tap gains in order to cancel the interference from the wave P2 to the wave P1 if the tap gains required to cancel the interference from the wave P1 to the wave P2 is determined. Thus, the polarized wave which is to be cancelled is altered from P2 to P1 merely by interchanging the corresponding tap gains between the attenuators 5 through 9 and the attenuators 5' through 9', with the polarities inversed.

For this reason, the filters of earth stations 4000 and 4000' (FIG. 6) are automatically controlled. Or, to achieve automatic equalization, instead of separately controlling the tap gains of these filters, the tap gains of only one of the two filters are automatically controlled. The other filter is supplied with the same tap gain control signals, but with reversed polarities. Thus, only one control unit 500 (FIG. 5) is sufficient for controlling the entire automatic equalization.

Figure 7:
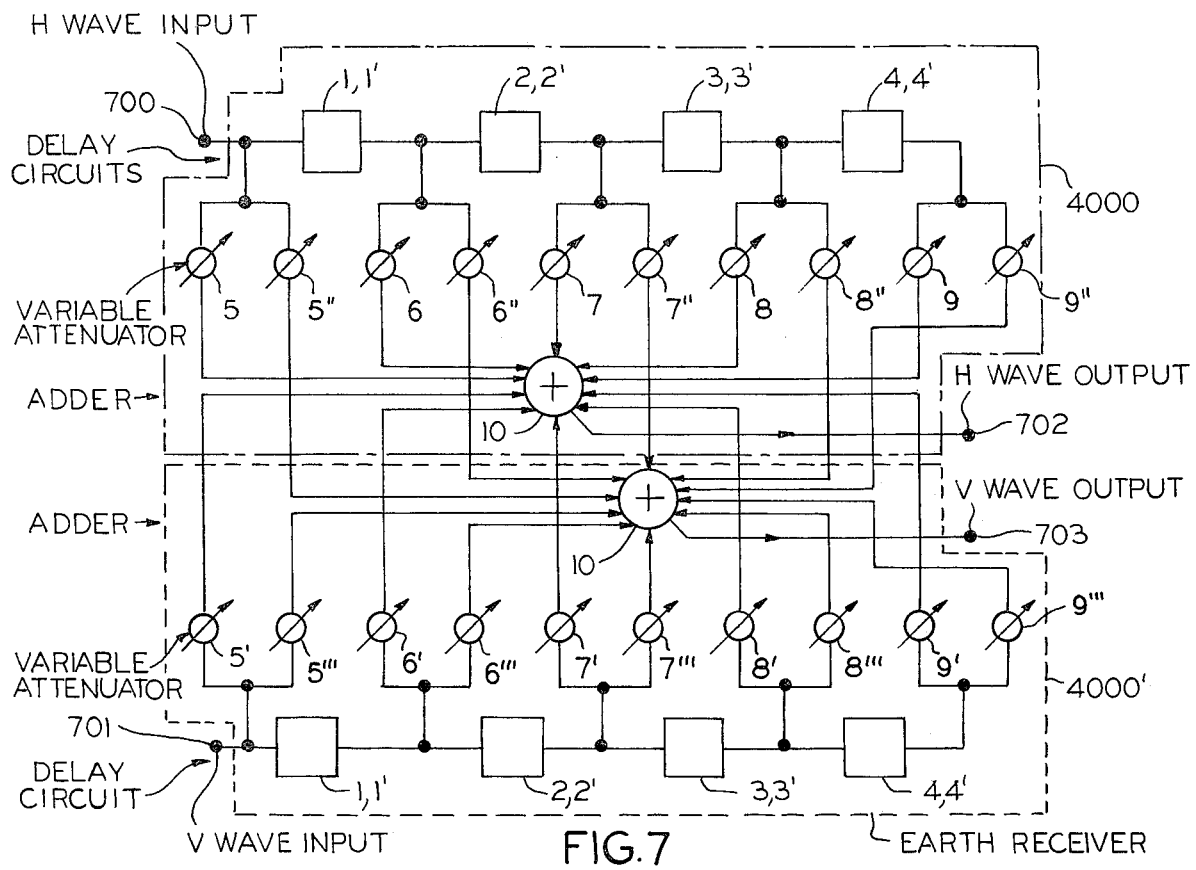
FIG. 7 illustrates a further modification of this invention.

A modification of the structure of FIG. 6 is shown in FIG. 7. Input terminals 700 and 701 are respectively fed with baseband signals transmitted on H- and V-waves. These two baseband signals are free of cross-polarization interferences when they are taken from the output terminals 702 and 703.

The structure of FIG. 7 differs from that of FIG. 6 since commonly-used delay circuits 1,1' through 4,4' are contained in the filters of the earth receiver stations 4000 and 4000' (FIG. 6).

The structure of FIG. 7 can dispense with half of the delay circuits which are used in the structure of FIG. 6.

Next to be described is a case where the carrier frequencies of the polarized waves P1 and P2 differ from each other by ΔfHz. A baseband signal $BA_1(t)$, which is obtained by coherent detection of the wave P1, may be expressed in the form of $\{h(t)+\epsilon_1 \cdot h(t+\Delta t_1)\}+\{-\epsilon_2 \cdot g(t+\Delta t_2)+\epsilon_3 \cdot g(t+\Delta t_3)e^{-j2\pi\Delta ft}\}$ ($\epsilon_1$, $\epsilon_2$ and $\epsilon_3$ being complex coefficients), where: h(t) is the transmitted H-wave component $a_k(=a(kt))$ at time t, and g(t) is the transmitted V-wave component $b_k(=b(kt))$ at time t. The first term represents the sum of a(kt) and self-interference 304 (FIG. 3). The second term represents cross-polarization interferences 302 and 303.

The coherent detection of the polarized wave P2 is made from its own carrier signal to give g(t). If the second term of $BA_1(t)$ is to be cancelled on the basis of g(t), the correction for the term $e^{-j2\pi\Delta ft}$ represents the phase rotation which must be achieved, responsive to changes in the tap gains of the attenuators 5' through 9' shown in FIG. 4A or FIG. 4B. However, such a correction cannot be made to follow the phase rotation term $e^{-j2\pi\Delta ft}$ if input noise adversely affects the filter output. This correction can be omitted if the polarized wave P2 is coherently detected by the carrier signal of the polarized wave P1. Thus, a baseband signal $BA_2(t)$, obtained by the coherent detection, is expressed in the form of $g(t) e^{-j2\pi\Delta ft}$ which is used for cancelling the second term of $BA_1(t)$ and will be in more detail mentioned later.

of the present invention which is capable of performing the correction without changing each tap gain of the attenuators 5' through 9' (FIG. 4A or FIG. 4B) for the term $e^{-j2\pi\Delta ft}$.

Figure 8:
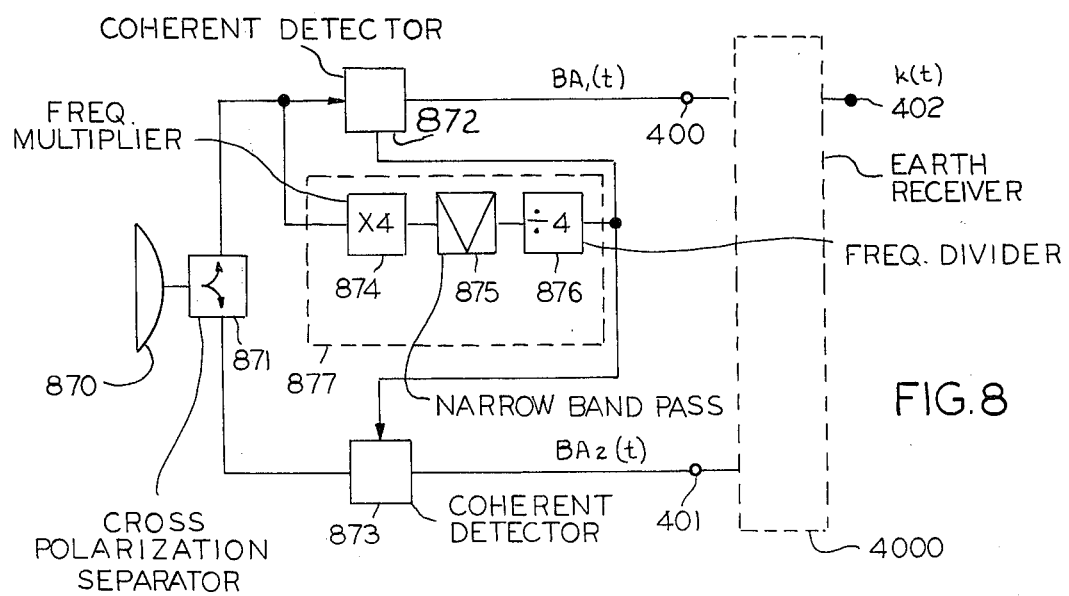
FIG. 8 illustrates a cross-polarization receiver representing one application of this invention.

This FIG. 8 shows a receiving antenna 870, a cross-polarization separator 871, two coherent detectors 872, 873, and a carrier extractor 877 for supplying a synchronization carrier wave to the coherent detector 872. The earth receiver 4000 includes the filter 4010 illustrated in FIG. 4A or 4B. A four-phase PSK modulation signal is fed to the receiving antenna 870. The carrier extractor 877 is composed of a quadrupler circuit 874 having a rectifier, a narrow band-pass filter 875 and a frequency divide-by-four counter 876.

Figure 9:
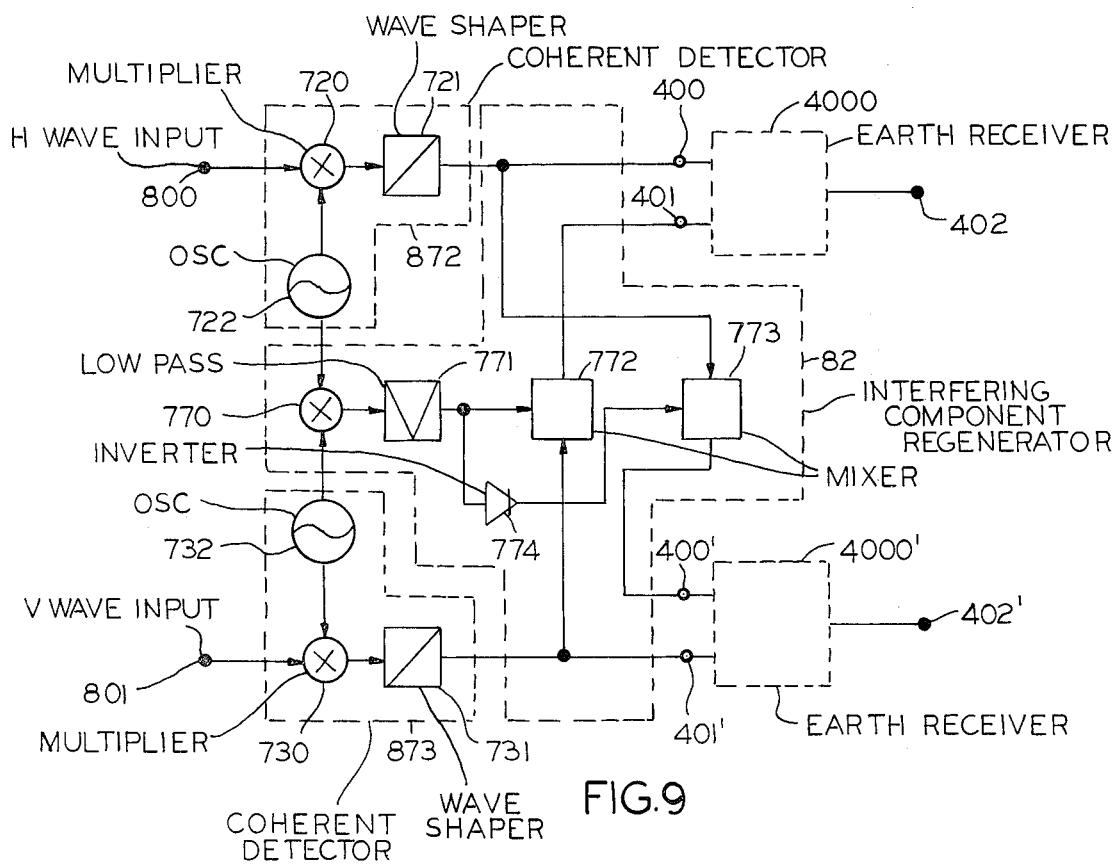
FIG. 9 illustrates another receiver representing yet another application of this invention.

Suppose that a desired polarized wave P1 is fed to the coherent detector 872, and that a polarized wave P2 (which will cause cross-polarization interferences) is fed to the coherent detector 873 (the structure of these detectors is illustrated in FIG. 9). Input terminal 400 receives signal $BA_1(t)$, as stated above. The coherent detectors 872 and 873 are commonly supplied with the output of the carrier extractor 877. The input terminal 401 is supplied with signal $BA_2(t)$. In this manner, the output terminal 402 of the earth receiver filter gives only the horizontal signal h(t), free of all interferences.

The cross-polarization separator 871 can be in the form of the ortho-coupler which is described in a paper by R. D. Briskman, entitled "The COMSTAR Program," Comsat Technical Review, vol. 7, No. 1, 1977, pp. 1-34 (Reference 5).

Another application of this invention is illustrated in FIG. 9. Its structural elements include two input terminals 800 to 801 which receive signals over the first and second polarized waves P1 and P2. A first coherent detector 872 includes a multiplier 720, a reference carrier oscillator 722, and a wave-shaping filter (low-pass filter) 721. A second coherent detector 873 has a multiplier 730, a reference carrier oscillator 732, and a wave-shaping filter 731.

An interfering component regenerator 82 gives the signal described as $g(t) \cdot e^{-j2\pi\Delta ft}$. First, a multiplier 770 and a low-pass filter 771 give the carrier frequency beat of the first and second polarized waves. Mixer 772 combines this beat $e^{-j2\pi\Delta ft}$ with the second coherent detection output signal $\{g(t)+\epsilon_1 \cdot g(t+\Delta t_1)\}+\{-\epsilon_2 \cdot h(t+\Delta t_2)+\epsilon_3 \cdot h(t+\Delta t_3) e^{-j2\pi\Delta ft}\}$ where: $\epsilon_{1'},\epsilon_{2'},\epsilon_{3'}\simeq 0$. The output of the mixer 772 gives signal $g(t) \cdot e^{-j2\pi\Delta ft}$ at a terminal 401.

As a result, the second term of a baseband signal $BA_1(t)$ which is obtained at another terminal 400 may be cancelled by the signal from the terminal 401.

A mixer 773 and a signal polarity inverter 774 are similarly intended for reproducing the interference component for the second polarized wave which is attributable to the first polarized wave. The signal polarity inverter 774 is used to reverse the phase rotation of the beat.

The application illustrated in FIG. 9 has a structure using only two coherent detection circuits, as the required minimum number.

As described above, the present invention enables a cancellation of cross-polarization interferences in the baseband as readily as in the IF band. It also enables a cross-polarization sharing to be realized without requiring a modification of a conventional transmission-reception system, which may be inadequate in cross-polarization discrimination.

Furthermore, the technique of this invention will prove particularly effective in equalizing cross-polarizations in satellite communication, especially in TDMA communication. There, signals from various earth stations must be successively received by the same receiving antenna. This elimination effect cannot be expected from conventional methods of interference cancellation in either the power feed system or the intermediate frequency band.

The main cause for deterioration of cross-polarization discrimination by fading is the attenuation of the desired polarization component. Although the greatest disturbance in this state derives from undesired cross-polarization components, these components can be cancelled on the receiving side because the information carried by the undesired cross-polarization components is obtained by a demodulator. Accordingly, if the cross-polarization discrimination would otherwise deteriorate in approximately a linear relation to the attenuation of the desired cross-polarization components (owing to rain or any other cause, for example), this invention can help maintain the discrimination at a fully acceptable level even if the desired cross-polarization components are attenuated to some extent.

In a radio system, if two stations employ a cross-polarization technique in order to use the same frequency, the phase rotation of the cross-polarization interference components (resulting from the carrier frequency difference between the two transmitting stations) poses a problem in cancelling interferences in the baseband. The present invention makes it possible to absorb this phase rotation before cancelling the cross-polarization interferences. This absorption enables a cancellation of the cross-polarization interferences so that the two frequencies are not adversely affected by the difference between the carrier frequencies of the two radio-transmitting earth stations which share the same frequency by a use of cross-polarization.

Those who are skilled in the art will readily perceive how to modify the system. Therefore, the appended claims are to be construed to cover all equivalent structures which fall within the true scope and spirit of the invention.

What is claimed is:

1. An equalizer for use in a receiver for reducing cross-polarization distortion in digital radio transmission wherein first and second sequences of digital data . . . $a_{k-2}, a_{k-1}, a_k, a_{k+1}, a_{k+2}$ . . . (k being a positive integer) and . . . $b_{k-2}, b_{k-1}, b_k, b_{k+1}, b_{k+2}$ . . . having the same bit rate are carried by first and second polarized waves which are orthogonal to each other:

said equalizer including filter means for providing a fifth sequence from third and fourth sequences . . . $A_{k-2}, A_{k-1}, A_k, A_{k+1}, A_{k+2}$ . . . and . . . $B_{k-2}, B_{k-1}, B_k, B_{k+1}, B_{k+2}$ . . . which are received on said first and second polarized waves, said fifth sequence . . . $C_{k-2}, C_{k-1}, C_k, C_{k+1}, C_{k+2}$ . . . represented by the following equation where each of the factors M, M', N and N' is either zero or a positive integer:

$$C_k = \sum_{i=-N}^{N'} \alpha_i \cdot A_{k+i} + \sum_{i=-M}^{M'} \beta_i \cdot B_{k+i}$$

($\alpha_i$ and $\beta_i$ being complex constants)

and means responsive to the output of said filter for supplying said first sequence free of cross-polarization interferences from said second polarized wave.

2. An equalizer for reducing cross-polarization distortion in digital data . . . $a_{k-2}, a_{k-1}, a_k, a_{k+1}, a_{k+2}$ . . . (k being a positive integer) and . . . $b_{k-2}, b_{k-1}, b_k, b_{k+1}, b_{k+2}$ . . . which is transmitted at the same bit rate by first and second polarized waves which are orthogonally related to each other, said equalizer being for use in a receiver of said first and second polarized waves;

said equalizer comprising filter means responsive to third and fourth sequences . . . $A_{k-2}, A_{k-1}, A_k, A_{k+1}, A_{k+2}$ . . . and . . . $B_{k-2}, B_{k-1}, B_k, B_{k+1}, B_{k+2}$ . . . in the receiver of said first and second polarized waves for producing fifth and sixth corresponding sequences . . . $\hat{A}_{k-2}, \hat{A}_{k-1}, \hat{A}_k, \hat{A}_{k+1}, \hat{A}_{k+2}$ . . . and $\hat{B}_{k-2}, \hat{B}_{k-1}, \hat{B}_k, \hat{B}_{k+1}, \hat{B}_{k+2}$ . . . which respectively are the estimated values of said third and fourth sequences on the receiving side, means for producing a seventh sequence . . . $C_{k-2}, C_{k-1}, C_k, C_{k+1}, C_{k+2}$ . . . represented by the following equation where each of the factors M, M', N, and N' is either zero or a positive integer, $$C_k = \sum_{i=-N}^{N'} \alpha_i \cdot A_{k+i} + \sum_{i=-M}^{M'} \beta_i \cdot B_{k+i} - \sum_{i=0}^{N'} \alpha_i' \cdot \hat{A}_{k+i} - \sum_{i=0}^{M'} \beta_i' \cdot \hat{B}_{k+i}$$

and means responsive to said fifth to seventh sequences for supplying from said filter means said first sequence free of cross-polarization interferences from said second polarized wave.

3. In a digital radio transmission system which transmits first and second sequences of digital data . . . $a_{k-2}, a_{k-1}, a_k, a_{k+1}, a_{k+2}$ . . . (k being a positive integer) and . . . $b_{k-2}, b_{k-1}, b_k, b_{k+1}, b_{k+2}$ . . . having the same bit rate and, respectively, carried by first and second polarized waves which are orthogonal to each other, an equalizer for removal of cross-polarization at a system receiver, said equalizer comprising:

first filter means responsive to third and fourth sequences . . . $A_{k-2}, A_{k-1}, A_k, A_{k+1}, A_{k+2}$ . . . and . . . $B_{k-2}, B_{k-1}, B_k, B_{k+1}, B_{k+2}$ . . . corresponding to said first and second sequences received by the receiver of said first and second polarized waves, for producing a fifth sequence . . . $C_{k-2}, C_{k-1}, C_k, C_{k+1}, C_{k+2}$ . . . represented by the following equation where each of the factors M, M', N and N' is either zero or a positive integer:

$$C_k = \sum_{i=N}^{N'} \alpha_i \cdot A_{k+i} + \sum_{i=M}^{M'} \beta_i \cdot B_{k+i}$$

and second filter means having an output which is a sixth sequence . . . $d_{k-2}, d_{k-1}, d_k, d_{k+1}, d_{k+2}$ . . . represented by the following equation:

$$d_k = -\sum_{i=M}^{M'} \beta_i \cdot A_{k+i} + \sum_{i=-N}^{N'} \alpha_i \cdot B_{k+i}$$

($\alpha_i$ and $\beta_i$ being complex constants)

wherein said first filter means cancels a cross-polarization interference of the second polarized wave acting upon the first polarized wave to cause said first sequence and said second filter means cancels a cross-polarization interference of the first polarized wave acting upon the second polarized wave to cause said second sequence.

4. In a digital radio transmission system which transmits signals in the form of first and second polarized waves which are orthogonal to each other and have the same bit rate, wherein first and second sequences of digital data are described as . . . $a_{k-2}, a_{k-1}, a_k, a_{k+1}, a_{k+2}$ . . . (k being a positive integer) and . . . $b_{k-2}, b_{k-1}, b_k, b_{k+1}, b_{k+2}$ . . . ; equalizer means for a cross-polarization receiver, said equalizer means comprising:

first filter means for producing third and fourth sequences . . . $A_{k-2}, A_{k-1}, A_k, A_{k+2}$ . . . and . . . $B_{k-2}, B_{k-1}, B_k, B_{k+1}, B_{k+2}$ . . . responsive to said first and second polarized waves, said third and fourth sequences corresponding to said first and second sequences, means for producing fifth and sixth sequences . . . $\hat{A}_{k-2}, \hat{A}_{k-1}, \hat{A}_k, \hat{A}_{k+1}, \hat{A}_{k+2}$ . . . and $\hat{B}_{k-2}, \hat{B}_{k-1}, \hat{B}_k, \hat{B}_{k+1}, \hat{B}_{k+2}$ . . . which respectively correspond to the estimated values of said third and fourth sequences on the receiving side, means for producing a seventh sequence . . . $C_{k-2}, C_{k-1}, C_k, C_{k+1}, C_{k+2}$ . . . represented by the following equation where each of the factors M, M', N and N' is either zero or a positive integer:

$$C_k = \sum_{i=-N}^{N'} \alpha_i \cdot A_{k+i} + \sum_{i=-M}^{M'} \beta_i \cdot B_{k+i} - \sum_{i=0}^{N'} \alpha_i' \cdot \hat{A}_{k+i} - \sum_{i=0}^{M'} \beta_i' \cdot \hat{B}_{k+i};$$ and second filter means having an output in the form of an eighth sequence . . . $d_{k-2}, d_{k-1}, d_k, d_{k+1}, d_{k+2}$ . . . represented by the following equation:

$$d = -\sum_{i=-M}^{M'} \beta_i \cdot A_{k+i} + \sum_{i=-N}^{N'} \alpha_i \cdot B_{k+i} + \sum_{i=0}^{M'} \beta_i' \cdot \hat{A}_{k+i} - \sum_{i=0}^{N'} \alpha_i' \cdot \hat{B}_{k+i}$$

wherein the cancellation of cross-polarization interference from the second polarized wave acting on the first polarized wave results from a passage of said first sequence through said first filter means; and the cancellation of cross-polarization interference from the first polarized wave acting on the second polarized wave results from a passage of second sequence through said second filter means.

5. A cross-polarization receiver for use in a digital radio transmission system wherein first and second sequences of digital data ... $a_{k-2}, a_{k-1}, a_k, a_{k+1}, a_{k+2}$ ... (k being a positive integer) and ... $b_{k-2}, b_{k-1}, b_k, b_{k+1}, b_{k+2}$ ..., having the same bit rate, are carried by first and second polarized waves having different carrier frequencies, said receiver comprising:

first coherent detector means for said first polarized wave, second coherent detector means for said second polarized wave which causes cross-polarization interference with said first wave, carrier extractor means for extracting the carrier of said first polarized wave to coherently detect said first polarized wave; and filter means which produces, third and fourth sequences ... $\hat{A}_{k-2}, \hat{A}_{k-1}, \hat{A}_k, \hat{A}_{k+1}, \hat{A}_{k+2}$ ... and ... $\hat{B}_{k-2}, \hat{B}_{k-1}, \hat{B}_k, \hat{B}_{k+1}, \hat{B}_{k+2}$ ... which are obtained by coherent detection of signals in said first and second polarized waves, respectively, said third and fourth sequences corresponding to said first and second sequences, means for producing a fifth sequence ... $C_{k-2}, C_{k-1}, C_k, C_{k+1}, C_{k+2}$ ... represented by the following equation where each of the factors M, M', N and N' is either a zero or a positive integer, $$C_k = \sum_{i=-N}^{N'} \alpha_i \cdot A_{k+i} + \sum_{i=-M}^{M'} \beta_i \cdot \hat{A}_{k+i}$$

($\alpha_i$ and $\beta_i$ being complex constants)

and means whereby the carrier obtained from said carrier extractor means is supplied to said first and second coherent detectors, and said filter means gives said first sequence free of cross-polarization interference from said said second polarized wave.

6. In digital radio transmission system wherein first and second sequences of digital data ... $a_{k-2}, a_{k-1}, a_k, a_{k+1}, a_{k+2}$ ... (k being a positive integer) and ... $b_{k-2}, b_{k-1}, b_k, b_{k+1}, b_{k+2}$ ..., with the same bit rate are carried by first and second polarized waves having different carrier frequencies, a cross-polarization receiver means comprising: first coherent detector means for detecting said first polarized wave, second coherent detector means for detecting said second polarized wave which causes cross-polarization interference with said first polarized wave, carrier extractor means for extracting the carrier of said first polarized wave to coherently detect this first polarized wave, and filter means for prociding first and second sequences corresponding to third and fourth sequences ... $A_{k-2}, A_{k-1}, A_k, A_{k+1}, A_{k+2}$ ... and ... $B_{k-2}, B_{k-1}, B_k, B_{k+1}, B_{k+2}$ ... which are obtained by coherent detection from said first and second polarized waves, respectively, and fifth and sixth sequences ... $A_{k-2}, A_{k-1}, A_k, A_{k+1}, A_{k+2}$ ... and ... $B_{k-2}, B_{k-1}, B_k, B_{k+1}, B_{k+2}$ ... which are the estimated values of said third and fourth sequences on the receiving side, a seventh sequence ... $C_{k-2}, C_{k-1}, C_k, C_{k+1}, C_{k+2}$ ... represented by the following equation where each of the factors M, M', N and N' is either a zero or a positive integer, $$C_k = \sum_{i=-N}^{N'} \alpha_i \cdot A_{k+i} + \sum_{i=-M}^{M'} \beta_i \cdot B_{k+i} - \sum_{i=0}^{N'} \alpha_i' \cdot A_{k+i} - \sum_{i=0}^{M'} \beta_i' \cdot B_{k-i}$$

($\alpha_i, \beta_i, \alpha_i'$ and $\beta_i'$ are complex constants)

wherein said filter means gives an output signal which is said first sequence, free of any cross-polarization interference from said second polarized wave.

7. In a digital radio transmission system wherein first and second digital sequences are carried by first and second polarized waves having different carrier frequencies, one of said waves causing a component of cross-polarization interference with the other of said waves, cross-polarization receiver means comprising: first coherent detector means for detecting said first polarized wave; second coherent detector means for detecting said polarized wave which causes said cross-polarization interference component in said first polarized wave; interfering component regenerator means which detects a beat frequency responsive to two reference carrier signals of said first and second coherent detector means, means for multiplying the output of said second coherent detector means by said detected beat frequency to give a signal resembling the cross-polarization interference component contained in the output of said first coherent detector means; first filter means responsive to the output signal of said regenerator means for cancelling the cross-polarization interferences from said second polarized wave acting on said first polarized wave; and second filter means responsive to the output signal of said regenerator means for cancelling the cross-polarization interferences from said first polarized wave acting on said second polarized wave.

8. A receiver for a communication system which transmits cyclically recurring digital signals over a pair of orthogonally related polarized waves, said receiver having first input terminal means for receiving a horizontal one of said orthogonal signals, second input terminal means for receiving a vertical one of said orthogonal signals, and an output terminal means; an individually associated cascaded plurality of delay circuit means coupled to each of said input terminals, the delay in each of said delay means being equal to the time spacing between said recurring signals, whereby a plurality of said recurring digital signals appear simultaneously at the outputs of each of each of said delay circuits; a variable attenuator means individually associated with the output of each of said delay circuit means for passing an incremental signal responsive to each of the recurring signals appearing simultaneously at the outputs of said delay circuits; adder means for adding each of said incremental signals to produce a first full signal when all of the digital signals received at one of said input terminals appear simultaneously at the outputs of the delay circuits associated therewith, said adder means adding each of said incremental signals to produce a second full signal when all of the digital signals received at the other of said input terminals appear simultaneously at the outputs of the delay circuits associated therewith, the sign of said second full signal having a polarity which is opposite to the polarity of the first full signal whereby said second full signal is subtracted from that part of the first full signal which appears simultaneously with said second full signal, said subtracted signal being the interference in the first signal which occurs responsive to the second signal, whereby only the signal applied to said one input terminal appears at the output of said adder.

9. The receiver of claim 8 and sampling means coupled between said adder and the output terminal means of said receiver for opening the output circuit during time intervals between said cyclically recurring signals.

10. The receiver of claim 9 and means for detecting each of said first full signals and means responsive to said detecting means for controlling said sampling means.

11. The receiver of claim 9 and means responsive to an output from said adder for feeding back a signal to operate said sampling means.

12. The receiver of claim 9 and means responsive to a multiplication of input signals for feeding back a control signal to adjust said variable attenuator means.

13. The receiver of claim 8 wherein there is a pair of said adder means and a pair of said variable attenuators associated with each of said delay circuits, one of each pair of said attenuators being connected to a corresponding one of said adding means, means for taking an output corresponding to said horizontal signal from one of said adder means, and means for taking an output corresponding to said vertical signal from the other of said adder means.

* * * * *

UNITED STATES PATENT AND TRADEMARK OFFICE
CERTIFICATE OF CORRECTION

PATENT NO. : 4,321,705
DATED : March 23, 1982
INVENTOR(S) : NAMIKI, Junji

It is certified that error appears in the above—identified patent and that said Letters Patent is hereby corrected as shown below:

On the Title page,

The name of the assignee is shown as "Nippon Electronics Co., Ltd."; however, it should be changed to --NIPPON ELECTRIC COMPANY, LIMITED--.

Signed and Sealed this

Twenty-first Day of September 1982

[SEAL]

Attest:

GERALD J. MOSSINGHOFF

Attesting Officer

Commissioner of Patents and Trademarks